United States Patent
Ellis et al.

(10) Patent No.: US 7,823,646 B2
(45) Date of Patent: Nov. 2, 2010

(54) RISER TENSIONER WITH LUBRICANT RESERVOIR

(75) Inventors: Fife B. Ellis, Houston, TX (US); Jeffery K. McCarty, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 840 days.

(21) Appl. No.: 11/280,118

(22) Filed: Nov. 16, 2005

(65) Prior Publication Data

US 2006/0108121 A1     May 25, 2006

Related U.S. Application Data

(60) Provisional application No. 60/629,543, filed on Nov. 19, 2004.

(51) Int. Cl.
*E21B 17/07* (2006.01)
(52) U.S. Cl. .................. 166/355; 166/367; 166/352
(58) Field of Classification Search ......... 166/353–355, 166/367, 345
See application file for complete search history.

(56) References Cited

U.S. PATENT DOCUMENTS

| | | | |
|---|---|---|---|
| 3,599,735 A | | 8/1971 | Slator et al. |
| 3,912,227 A | | 10/1975 | Meeker et al. |
| 3,970,292 A | * | 7/1976 | Dachicourt et al. ...... 267/64.28 |
| 4,004,532 A | | 1/1977 | Reynolds |
| 4,072,190 A | * | 2/1978 | Raulins ....................... 166/355 |
| 4,222,341 A | | 9/1980 | Larsen et al. |
| 4,272,059 A | | 6/1981 | Noerager et al. |
| 4,367,981 A | * | 1/1983 | Shapiro .................... 405/224.2 |
| 4,379,657 A | | 4/1983 | Widiner et al. |
| 4,432,420 A | | 2/1984 | Gregory et al. |
| 4,537,533 A | | 8/1985 | Hampton |
| 4,721,053 A | * | 1/1988 | Brewerton ............. 114/230.13 |
| 4,799,827 A | * | 1/1989 | Jaqua ....................... 405/224.4 |
| 4,808,035 A | | 2/1989 | Stanton et al. |
| 4,828,230 A | * | 5/1989 | Steger et al. ............. 267/64.16 |
| 4,883,387 A | | 11/1989 | Myers et al. |
| 5,069,488 A | * | 12/1991 | Freyer et al. ................. 285/302 |
| 5,252,004 A | * | 10/1993 | Butler et al. ................. 405/211 |
| 5,366,324 A | | 11/1994 | Arlt et al. |
| 5,658,095 A | | 8/1997 | Arlt et al. |
| 5,846,028 A | | 12/1998 | Thory |

(Continued)

FOREIGN PATENT DOCUMENTS

DE     10251212 A1     5/2004

(Continued)

*Primary Examiner*—Thomas A Beach
*Assistant Examiner*—Matthew R Buck
(74) *Attorney, Agent, or Firm*—Bracewell & Giuliani

(57) ABSTRACT

A tensioner for an offshore structure has inner and outer barrels engaging each other for movement between retracted and extended positions. The barrels are filled with gas pressure. A primary seal is located between the inner and outer barrels at the open end of the inner barrel. An annular lubricant reservoir is mounted to an interior wall surface of the inner barrel at the open end of the inner barrel. A lubricant port extends from the lubricant reservoir through the inner barrel to a high pressure side of the primary seal for dispensing lubricant between the inner and outer barrels. A fill tube leads from the reservoir to the exterior of the inner barrel for replenishing lubricant.

15 Claims, 1 Drawing Sheet

U.S. PATENT DOCUMENTS 6,554,072 B1 4/2003 Mournian et al.
6,691,784 B1 2/2004 Wanvik

FOREIGN PATENT DOCUMENTS

| | | |
|---|---|---|
| EP | 0349267 | 3/1990 |
| EP | 1428973 A1 | 6/2004 |
| GB | 2180619 A | 4/1987 |
| WO | WO2004/013452 A1 | 2/2004 |

* cited by examiner

RISER TENSIONER WITH LUBRICANT RESERVOIR

CROSS REFERENCE TO RELATED APPLICATION

This application claims priority to provisional patent application Ser. No. 60/629,543, filed Nov. 19, 2004.

FIELD OF THE INVENTION

This invention relates in general to riser tensioners for offshore drilling and production floating platforms, and in particular to a riser tensioner having an internal lubricant reservoir for lubricating seals.

BACKGROUND OF THE INVENTION

Risers are used in offshore oil and gas well production for conveying well fluids from a subsea wellhead to a floating production platform. Tensioners are employed at the platform to apply tension to the risers. A typical tensioner comprises a telescoping piston and cylinder arrangement supplied with gas pressure from accumulators. Waves and currents cause the piston and cylinder to extend and retract. Hydraulic fluid within the chamber provides lubrication.

In one type, the piston component comprises a barrel that slidingly engages the cylinder or other barrel. Each barrel has a closed end and an open end, the open ends being in fluid communication with each other. The interiors of the barrels serve as the chamber for receiving gas pressure. By combining the interior of each barrel, the volume of the chamber may be sufficient to eliminate external accumulators or at least reduce the amount of external accumulators. A larger internal volume improvises the cylinder stiffness versus stroke characteristics. Provisions must be made, however, for lubrication of the primary seals, and the hydraulic fluid reduces the amount of volume that can be filled with gas.

SUMMARY OF THE INVENTION

In this invention, the tensioner has inner and outer barrels that telescopingly engage each other. An annular lubricant reservoir is mounted to an interior wall surface of the inner barrel. A lubricant port extends from the lubricant reservoir through the inner barrel to an exterior wall surface of the inner barrel for dispensing lubricant between the inner and outer barrels. A gas inlet port leads to the interiors of the inner and outer barrels for applying gas pressure, urging the inner and outer barrels to an extended position.

A fill tube leads from the lubricant reservoir to an outer end of the inner barrel for replenishing lubricant. Preferably, the reservoir is much smaller in volume than the volume of either of the barrels and has a generally toroidal configuration. Upper and lower ends of the reservoir are connected by an inner wall spaced radially inward from the interior wall surface of the inner barrel. A communication opening in the reservoir receives gas pressure from the inner and outer barrels, placing the lubricant at the same pressure as the gas.

DETAILED DESCRIPTION OF THE INVENTION

Figure 1:
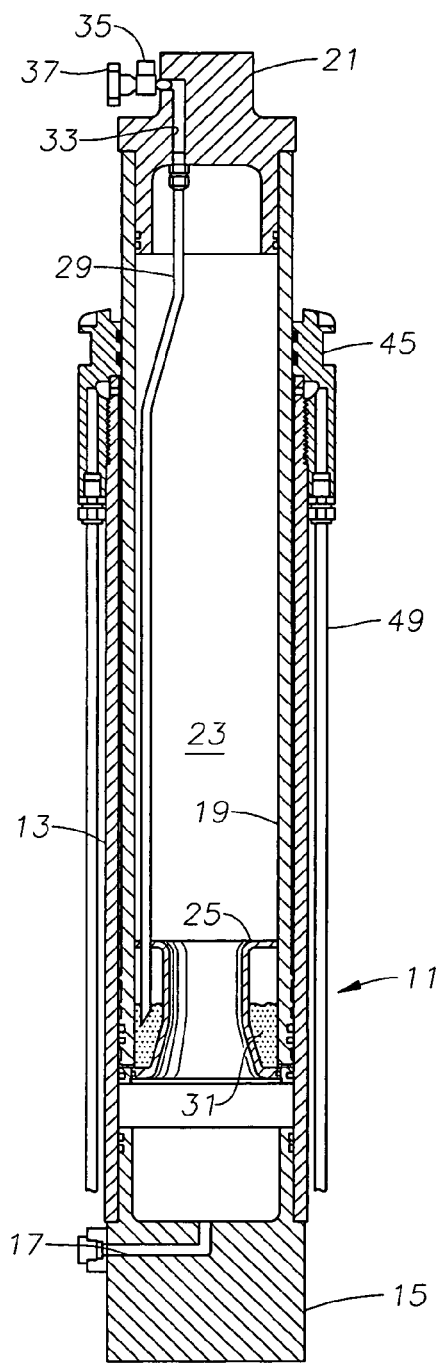
FIG. 1 is a sectional view illustrating a riser tensioner constructed in accordance with this invention.

Referring to FIG. 1, tensioner 11 is constructed for use in applying tension to a riser for a drilling or production floating offshore platform. Because of waves and current, the platform moves vertically and laterally relative to the riser. A number of tensioners 11 will be connected between the riser and the platform in a conventional manner to maintain a desired tension in the riser.

Tensioner 11 has an outer barrel 13 that is a cylinder having a lower closed end cap 15. A gas inlet port 17 extends through lower end cap 15 for supplying gas to the interior of outer barrel 13. Typically the gas is nitrogen. Tensioner 11 has a hollow piston or inner barrel 19 that slides in a telescoping manner within outer barrel 13. Inner barrel 19 is a cylinder that has an upper end that protrudes above outer barrel 13 and terminates with an upper closed end cap 21. Outer barrel 13 and inner barrel 19 define a chamber 23 of variable volume.

Figure 2:
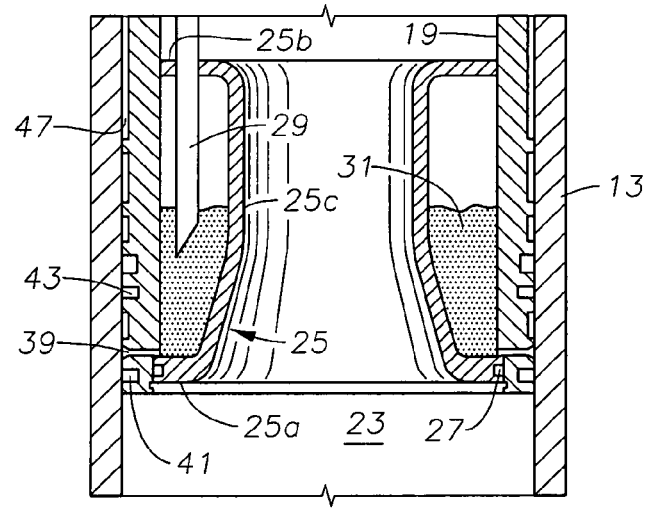
FIG. 2 is an enlarged sectional view of a portion of the riser tensioner of FIG. 1.

Referring also to FIG. 2, a lubricant reservoir or dam 25 is mounted in the interior of inner barrel 19 for movement therewith. Lubricant reservoir 25 is preferably located at the lower end of inner barrel 19 and has a toroidal shape. Lubricant reservoir 25 has a lower end 25a that is generally perpendicular to the axis of inner barrel 19 in this example. Lower end 25a has an inner periphery or edge that is sealed to the lower end of inner barrel 19 by a seal 27. The inner periphery of lower end 25a abuts a downward facing shoulder in inner barrel 19, preventing upward movement of reservoir 25 relative to inner barrel 19. Lower end 25a may be secured to inner barrel 19 in a variety of manners, such as by a snap ring (not shown) that prevents downward movement of reservoir 25 relative to inner barrel 19.

Lubricant reservoir 25 has an upper end 25b that is generally perpendicular to the axis of inner barrel 19 in this example and joins the inner sidewall of inner barrel 19. Preferably, the inner periphery of upper end 25b does not seal to the inner diameter of inner barrel 19, rather a clearance (not shown) exists to communicate the pressure in chamber 23 to the interior of reservoir 25. Alternately, one or more ports could be provided in upper end 25b to communicate pressure from chamber 23 to the interior of reservoir 25. The central portion 25c of reservoir 25 between lower end 25a and upper end 25b may be of any desired shape. In this embodiment, the upper part of central portion 25c is generally cylindrical and the lower part is conical. A portion of inner barrel 19 between lower end 25a and upper end 25b defines an outer wall for lubricant reservoir 25. The volume of reservoir 25 is much smaller than the volume of the interior of either outer barrel 13 or inner barrel 19. The distance from lower end 25a to upper end 25b is much smaller than the length of inner barrel 19.

Lubricant reservoir 25 holds a quantity of hydraulic fluid or lubricant 31 that may be of a variety of types of oil. Lubricant 31 is retained within lubricant reservoir 25 by seal 27 at lower end 25a. Preferably, means exist to replenish lubricant 31 within lubricant reservoir 25 from time to time. In the preferred embodiment, a fill tube 29 extends through reservoir upper end 25b and has a lower end located within reservoir 25. Tube 29 has an upper end that is secured to upper end cap 21 (FIG. 1). A port 33 extends through upper end cap 21 from the connection with tube 29 to the exterior of upper end cap 21 for introducing lubricant. An optional sight glass 35 is mounted to the upper end of the port 33 for observing whether gas or lubricant is contained therein. A valve 37 mounts to the exterior of sight glass 35.

Referring again to FIG. 2, a plurality of communication ports 39 extend laterally through the sidewall of inner barrel 19 slightly above lower end 25a of lubricant reservoir 25. A wiper seal 41 may be located on the outer diameter of inner barrel 19 below communication port 39. The pressure differential across wiper seal 41 will be low or zero. A pair of high pressure primary seals 43 is located above wiper seal 41 and communication ports 39 for sealing to the inner diameter of outer barrel 13. Primary seals 43 are exposed to low pressure lubricant on the upper side and the high pressure of chamber 23 on the lower side, which may be as high as 3000 psi. Lubricant 31 from reservoir 25 flows through communication ports 39 to lubricate seals 43 as barrels 13 and 19 reciprocate relative to each other.

Referring to FIG. 1, a collar 45 is located on the upper end of outer barrel 13 for slidingly engaging the outer diameter of inner barrel 19. A thin annular clearance 47 is located between barrels 13, 19 from high pressure seals 43 to collar 45. Collar 45 seals to the outer diameter of inner barrel 19, serves as a guide, and blocks entry of debris to clearance 47. In this embodiment, one or more lubricant lines 49 leads from an external reservoir and accumulator (not shown) to a cavity in collar 45 for supplying lubricant to the interior of collar 45 under a low pressure. The cavity in collar 45 is in communication with the inner diameter of collar 45, thus lubricant under low pressure is maintained in the thin annular clearance between high pressure seals 43 and collar 45.

During installation of tensioner 11, gas under pressure is introduced into chamber 23. The gas also enters reservoir 25 and fill tube 29. The installer connects a pump (not shown) to valve 37, the pump having an intake leading to a source of lubricant 31. The installer opens valve 37 and pumps lubricant 31 through port 33 and tube 29 into reservoir 25. The pump pressure must be slightly greater than the internal pressure in chamber 23 in order for lubricant 31 to flow into reservoir 25 and displace the gas contained therein. Preferably, the installer dispenses sufficient lubricant 31 to substantially fill reservoir 25. This may be done by measuring the amount of lubricant 31 flowing through tube 29. After filling, the installer closes valve 37. Normally, lubricant 31 remains in tube 29 and can be observed in sight glass 35 because of the pressure applied to the lubricant 31 in chamber 29. If the installer overfills lubricant reservoir 25, the excess would flow out the clearance at the inner periphery of upper end 25b and enter chamber 23. The excess lubricant would flow to lower end cap 15 and remain there without harming the operation of tensioner 11.

During operation, due to wave movement and current, inner barrel 19 will stroke relative to outer barrel 13. Communication ports 39 continuously meter an amount of lubricant 31 to seals 43. Periodically, an operator will check sight glass 35. An appearance of bubbles indicates that gas in chamber 23 has entered tube 29, informing the operator that the level of lubricant 31 has dropped below the lower end of tube 29. The operator refills lubricant in the same manner as described above.

The invention has significant advantages. The lubricant reservoir takes up only a small amount of space in the interior of the tensioner. This allows most of the volume of the tensioner chamber to be filled with gas. The large volume of the tensioner reduces or may eliminate the need for external accumulators. The fill tube allows easy replenishment of the lubricant.

While the invention has been shown in only one of its forms, it should be apparent to those skilled in the art that it is not so limited but is susceptible to various changes without departing from the scope of the invention.

The invention claimed is:

1. A tensioner for applying tension to a subsea member extending to a floating offshore structure, comprising:
    inner and outer barrels telescopingly engaging each other, one of the barrels adapted to be mounted to the offshore structure and the other to the riser;
    the barrels having interiors in fluid communication with each other, defining a chamber containing a gas under pressure, the gas pressure urging the barrels toward an extended position:
    a primary seal between the inner and outer barrels at an interface between the inner and outer barrels, the primary seal sealing the gas pressure within the chamber, the primary seal separating a high pressure portion of the interface, which is exposed to the gas under pressure, from an atmospheric pressure portion of the interface;
    an annular lubricant reservoir mounted in the chamber to an interior wall surface of the inner barrel, the lubricant reservoir containing a lubricant that is exposed to the gas pressure;
    a lubricant port extending from the lubricant reservoir through a sidewall of the inner barrel to an exterior wall surface of the inner barrel in the high pressure portion of the interface for dispensing lubricant to the high pressure portion of the interface.

2. The tensioner according to claim 1, further comprising:
    a fill tube leading from the lubricant reservoir through the chamber to an outer end of the inner barrel for replenishing lubricant.

3. The tensioner according to claim 1, wherein the reservoir has a generally toroidal configuration with a central opening aligned with a longitudinal axis of the barrels.

4. The tensioner according to claim 1, wherein the reservoir has first and second ends connected by an inner wall spaced radially inward from the interior wall surface, and wherein a portion of the interior wall surface serves as an outer wall of the reservoir.

5. The tensioner according to claim 1, wherein the lubricant reservoir is mounted to an inner end of the inner barrel.

6. The tensioner according to claim 1, wherein the lubricant within the reservoir is in physical contact with the gas in the chamber.

7. The tensioner according to claim 1, wherein:
    each of the barrels has an open end and a closed end;
    the lubricant port is located adjacent the open end of the inner barrel.

8. A tensioner for an offshore structure, comprising:
    inner and outer barrels engaging each other for movement between retracted and extended positions, each having a closed end and an open end communicating interiors of the barrels with each other to define a chamber containing a gas under pressure, one of the barrels adapted to be mounted to the offshore structure and the other to a riser;
    a gas port for introducing gas under pressure to the chamber, urging the barrels toward the extended position;
    a primary seal between an exterior wall surface of the inner barrel and an interior wall surface of the outer barrel, the primary seal being located adjacent the open end of the inner barrel for sealing the gas pressure within the chamber;
    an annular lubricant reservoir mounted to an interior wall surface of the inner barrel adjacent the open end of the inner barrel, the reservoir having an interior containing lubricant that is in communication with the gas pressure in the chamber; and
    a lubricant port extending from the lubricant reservoir through a sidewall of the inner barrel to the exterior wall surface of the inner barrel between the open end of the inner barrel and the primary seal for dispensing lubricant between the inner and outer barrels.

9. The tensioner according to claim 8, further comprising:

a fill tube leading from the lubricant reservoir through the chamber to the closed end of the inner barrel for replenishing lubricant.

10. The tensioner according to claim 8, wherein the reservoir has a toroidal configuration with a central opening that is coaxial with a longitudinal axis of the inner barrel.

11. The tensioner according to claim 8, wherein the reservoir has first and second ends, each of the ends having an inner edge that abuts the interior wall surface of the inner barrel.

12. The tensioner according to claim 8, further comprising:

wherein the lubricant in the reservoir is in physical contact with the gas in the chamber.

13. The tensioner according to claim 8, wherein the reservoir has a closed lower end and an inner wall to prevent lubricant from flowing into the chamber.

14. A method for applying tension to a subsea member extending to a floating offshore structure, comprising:

mounting a lubricant reservoir to an interior wall surface of an inner barrel and forming a lubricant port from the lubricant reservoir through the interior wall surface of the inner barrel to an outlet on the exterior wall surface of the inner barrel;

placing the inner barrel into an outer barrel;

installing a primary seal at an interface between an exterior surface of the inner barrel and an interior surface of the outer barrel:

connecting the subsea member to one of the barrels and the offshore structure to the other of the barrels;

pressurizing interiors of the inner and, outer barrels with a gas to urge the barrels toward an extended position relative to each other, the primary seal defining a high pressure portion and an atmospheric pressure portion of the interface, the high pressure portion of the interface being exposed to the gas in the chamber, the outlet of the lubricant port being in the high pressure portion of the interface; and introducing lubricant to the lubricant reservoir, which flows through the lubricant port to lubricate the interface between the inner and outer barrels as they move relative to each other.

15. The method according to claim 14, further comprising:

communicating pressure of the gas in the barrels to the lubricant in the reservoir.

* * * * *